(12) United States Patent
Nadig et al.

(10) Patent No.: US 7,293,602 B2
(45) Date of Patent: Nov. 13, 2007

(54) FIN TUBE ASSEMBLY FOR HEAT EXCHANGER AND METHOD

(75) Inventors: Ranga Nadig, Cherry Hill, NJ (US); Ram Chandran, Mt. Laurel, NJ (US); Michael Phipps, Marlton, NJ (US)

(73) Assignee: Holtec International Inc., Marlton, NJ (US)

( * ) Notice: Subject to any disclaimer, the term of this patent is extended or adjusted under 35 U.S.C. 154(b) by 42 days.

(21) Appl. No.: 11/158,701

(22) Filed: Jun. 22, 2005

(65) Prior Publication Data

US 2006/0289151 A1    Dec. 28, 2006

(51) Int. Cl.
   *F28F 1/20* (2006.01)
(52) U.S. Cl. ............... 165/133; 165/134.1; 29/890.054
(58) Field of Classification Search ........... 29/890.046, 29/890.038, 890.054; 165/133, 134.1
   See application file for complete search history.

(56) References Cited

U.S. PATENT DOCUMENTS

| | | | |
|---|---|---|---|
| 3,955,620 A | 5/1976 | Artemov |
| 3,958,429 A | 5/1976 | Kirsch |
| 3,968,836 A | 7/1976 | Larinoff |
| 3,976,126 A | 8/1976 | Ruff |
| 3,976,127 A | 8/1976 | Harris |
| 4,029,144 A | 6/1977 | Harris |
| 4,045,961 A | 9/1977 | Schoonman |
| 4,053,014 A | 10/1977 | Neff et al. |
| 4,057,976 A | 11/1977 | del Toro |
| 4,068,494 A | 1/1978 | Kramer |
| 4,095,648 A | 6/1978 | Shipes |
| 4,098,332 A | 7/1978 | Bratthall et al. |
| 4,118,944 A | 10/1978 | Lord et al. |
| 4,135,282 A | 1/1979 | Neff et al. |
| 4,158,908 A | 6/1979 | Block et al. |
| 4,159,741 A | 7/1979 | Nonnenmann |
| 4,160,476 A | 7/1979 | Ashton et al. |
| 4,168,618 A | 9/1979 | Saier et al. |
| 4,179,911 A | 12/1979 | Saier et al. |
| 4,192,052 A | 3/1980 | MacDonald |
| RE30,275 E | 5/1980 | del Toro et al. |
| 4,202,405 A | 5/1980 | Berg |
| 4,206,738 A | 6/1980 | Heeren |
| 4,227,572 A | 10/1980 | Harlan |
| RE30,433 E | 11/1980 | Bussjager |
| 4,240,502 A | 12/1980 | Larinoff |
| 4,300,630 A | 11/1981 | Trojani |
| 4,305,459 A | 12/1981 | Nonnenmann et al. |
| 4,313,490 A | 2/1982 | Heeren et al. |
| 4,344,386 A | 8/1982 | Black |
| 4,349,950 A | 9/1982 | Bowden |
| 4,353,162 A | 10/1982 | Van Meteren |
| 4,417,619 A | 11/1983 | Minami |
| 4,425,942 A | 1/1984 | Hage et al. |

(Continued)

*Primary Examiner*—Teresa J. Walberg
(74) *Attorney, Agent, or Firm*—Michael B. Fein; Cozen O'Connor, P.C.

(57) ABSTRACT

A fin and tube assembly for use in a heat exchanger comprising a carbon steel tube, a carbon steel fin, and an external brazing compound comprising a material selected from the group consisting of nickel, chrome, copper, aluminum, zinc, and graphite brazed to the tube and fin is disclosed. A method for making the assembly and a power plant which includes the assembly are also disclosed. The brazing compound functions to prevent corrosion of the carbon steel and also functions to attach the tube and fin together.

11 Claims, 1 Drawing Sheet

U.S. PATENT DOCUMENTS

| | | | |
|---|---|---|---|
| 4,428,419 A | 1/1984 | Dubrovsky et al. | |
| 4,429,738 A | 2/1984 | Woodhull, Jr. | |
| 4,437,512 A | 3/1984 | DeVore | |
| 4,446,914 A | 5/1984 | Russell | |
| 4,476,704 A | 10/1984 | Hage et al. | |
| 4,499,123 A | 2/1985 | Suzuki et al. | |
| 4,503,907 A | 3/1985 | Tanaka et al. | |
| 4,513,813 A | 4/1985 | Zanobini | |
| 4,537,248 A | 8/1985 | Minami | |
| 4,550,570 A | 11/1985 | Trage et al. | |
| 4,580,401 A | 4/1986 | Ruscheweyh | |
| 4,588,025 A | 5/1986 | Imai et al. | |
| 4,601,089 A | 7/1986 | Gal | |
| 4,616,391 A | 10/1986 | Cunningham et al. | |
| 4,657,070 A | 4/1987 | Kluppel | |
| 4,660,632 A | 4/1987 | Yampolsky et al. | |
| 4,685,441 A | 8/1987 | Yanko | |
| 4,691,766 A | 9/1987 | Wurz et al. | |
| 4,691,767 A | 9/1987 | Tanaka et al. | |
| 4,692,978 A | 9/1987 | Cunningham et al. | |
| 4,714,049 A * | 12/1987 | McCoy et al. | 122/4 D |
| 4,715,432 A | 12/1987 | Paikert | |
| 4,767,497 A | 8/1988 | Shattes et al. | |
| 4,794,983 A | 1/1989 | Yoshida et al. | |
| 4,842,185 A | 6/1989 | Kudo et al. | |
| 4,854,381 A | 8/1989 | Mikula | |
| 4,880,054 A | 11/1989 | Yoshida et al. | |
| 4,901,907 A | 2/1990 | Enokido et al. | |
| 4,903,491 A | 2/1990 | Larinoff | |
| 4,905,474 A | 3/1990 | Larinoff | |
| 4,918,943 A | 4/1990 | Faust | |
| 4,938,282 A | 7/1990 | Zohler | |
| 4,949,543 A | 8/1990 | Cottone et al. | |
| 4,955,525 A | 9/1990 | Kudo et al. | |
| 4,960,170 A | 10/1990 | Carter | |
| 5,010,643 A | 4/1991 | Zohler | |
| 5,036,693 A | 8/1991 | Duffy | |
| 5,042,574 A | 8/1991 | Cottone et al. | |
| 5,070,938 A | 12/1991 | Mizuno et al. | |
| 5,102,032 A | 4/1992 | Cottone et al. | |
| 5,123,482 A | 6/1992 | Abraham | |
| 5,181,558 A | 1/1993 | Tsuda et al. | |
| 5,190,596 A * | 3/1993 | Timsit | 148/23 |
| 5,267,610 A | 12/1993 | Culbert | |
| 5,277,358 A | 1/1994 | Cottone et al. | |
| 5,287,919 A | 2/1994 | George, II et al. | |
| 5,303,770 A | 4/1994 | Dierbeck | |
| 5,305,945 A * | 4/1994 | Cottone et al. | 228/183 |
| 5,316,206 A | 5/1994 | Syslak et al. | |
| 5,355,943 A | 10/1994 | Gonano et al. | |
| 5,467,816 A | 11/1995 | Larinoff | |
| 5,477,919 A | 12/1995 | Karube | |
| 5,501,269 A | 3/1996 | Jenkins | |
| 5,526,876 A | 6/1996 | Karube | |
| 5,588,319 A | 12/1996 | Bianchi et al. | |
| 5,617,916 A | 4/1997 | Shigenaka et al. | |
| 5,632,329 A | 5/1997 | Fay | |
| 5,730,213 A | 3/1998 | Kiser et al. | |
| 5,761,807 A | 6/1998 | Schuez et al. | |
| 5,775,411 A | 7/1998 | Schuez et al. | |
| 5,896,918 A | 4/1999 | Witte | |
| 5,966,809 A | 10/1999 | Pierce | |
| 6,142,223 A | 11/2000 | Bodas | |
| 6,147,317 A | 11/2000 | Brundermann | |
| 6,166,348 A | 12/2000 | Brundermann | |
| 6,234,210 B1 | 5/2001 | Millias | |
| 6,332,494 B1 | 12/2001 | Bodas et al. | |
| 6,364,009 B1 | 4/2002 | MacManus et al. | |
| 6,424,529 B2 | 7/2002 | Eesley et al. | |
| 6,446,715 B2 | 9/2002 | Watanabe | |
| 6,488,078 B2 | 12/2002 | Beutler | |
| 6,715,667 B2 * | 4/2004 | Korischem et al. | 228/183 |
| 6,786,072 B2 | 9/2004 | Beutler et al. | |
| 6,840,307 B2 | 1/2005 | Eesley et al. | |
| 6,848,609 B2 | 2/2005 | Korischem et al. | |
| 2006/0116036 A1* | 6/2006 | Sundel | 440/89 R |

\* cited by examiner

FIN TUBE ASSEMBLY FOR HEAT EXCHANGER AND METHOD

FIELD OF THE INVENTION

This invention relates to heat exchangers, and particularly to tube and fin assemblies, methods for making such assemblies, systems which include such assemblies, and methods for making the systems.

BACKGROUND OF THE INVENTION

Air cooled heat transfer equipment is used in a variety of industrial settings. For example, air cooled condensers are used in large power plants as alternatives to water-cooled systems. Such condensers usually include elongated tubes of elliptical or oblong cross section arranged in a horizontal, vertical, or A-frame construction. The elongated tubes include high thermal conductivity fins which are brazed or otherwise attached to the exterior of the tubes. The condensers are designed for life expectancies of at least 30 years and therefore the tube and fin assemblies must be highly corrosion resistant. The tube and fin assemblies are also used in heat transfer equipment other than condensers.

The first generation of such tube and fin assemblies included carbon steel fins and tubes which were galvanized for corrosion protection. The galvanizing method entailed several cumbersome processes, for example the finned tube had to undergo a number of steps including cleaning, pickling, and rinsing, before galvanizing could take place. Unlike standard galvanization methods, methods for manufacturing galvanized steel assemblies required higher zinc bath temperature and larger bath sizes. These facilities are not readily available globally. Furthermore, zinc is considered as a heavy metal and can leach into ground water under the acid rain conditions.

Because of these and other problems with the galvanizing method, a second generation of tube and fin assemblies which eliminated the galvanizing step was developed. Such second generation assemblies had aluminum-coated carbon steel tubes brazed to aluminum fins. These second generation assemblies were very difficult to manufacture due in part to the complexity of brazing of dissimilar metals. Brazing such dissimilar metals requires very special brazing materials and techniques. The base tube has to be clad first with an aluminum based alloy. Tubes have to be coated prior to fin assembly. The fin material has to be of the same material as the clad on the base tube. In addition, a flux of different material than the coating has to be applied to the tube and fins prior to the brazing process.

Historically, the term "brazing" has meant the joining of two components using brazing material comprising brass. The term brazing, as used in this art, does not refer to conventional brazing techniques using brass or a coating of a flux comprising brass.

Various attempts have been made to improve the brazing materials and techniques for such aluminum finned tube assemblies. One recent patent, Korischem, et al., U.S. Pat. 6,848,609, assigned to GEA Energietechnik GmbH, describes a fluxing technique with a fluxing agent of cesium-aluminum tetrafluoride applied in lines onto the crests of at least one of the ends of the finned structure, placing the structure upon a broad side of a flat tube coated with a zinc/aluminum alloy, and subsequently joining in a brazing furnace in the presence of an inert gas at a temperature of between 370° and 470° C. to produce the assembly.

Another attempt at solving the problem of galvanizing very large steel fin-steel tube assemblies has been to reduce the tube size which allowed the assemblies to be successfully galvanized There has been a long-felt need in the art to provide large tube and fin assemblies for air cooled condenser systems which avoid the problems associated with prior galvanizing techniques and prior aluminum fin techniques.

SUMMARY OF THE INVENTION

The present invention comprises in one aspect a method of making a tube and fin assembly comprising coating a carbon steel fin and a carbon steel tube with a brazing compound. The brazing compound preferably comprises a material selected from the group consisting of nickel, chrome, copper, aluminum, zinc, and graphite. The coated tube and fin are joined to form an assembly by heating the assembly in a furnace. By brazing, we mean melting the coating so as to form a permanent bond.

Another aspect of the invention is a tube and fin assembly for use in a heat exchanger comprising a carbon steel tube, a carbon steel fin, and an external coating brazed to the tube and fin.

The invention also comprises a power plant which includes a steam turbine with electricity generator, a steam generator, and a heat exchanger comprised of the novel tube and fin assembly to condense the turbine exhaust steam.

The tube and fin assembly may be manufactured in several alternative ways. For example, the fins can be coated with the brazing compound in one step, and the tube can be coated with the same brazing compound in a second step, or the tube and fin can be coated at the same time in one step. The tube and fin can be coated with the same brazing compound or with different brazing compounds, of various compositions. Coating the tube can take place at a different location from the location where the fin is coated.

The coated fins are preferably clamped to the coated tube and the assembly is then passed through a furnace operating under a controlled atmosphere. The furnace temperature can be varied, depending on the tube and fin material and dimensions. At the exit of the furnace, the fins are brazed to the tubes and the entire fin-tube surface is coated with the brazing compound.

Various brazing compounds can be used, and the composition of the brazing compounds can be selected based on specific properties desired. The brazing compounds preferably comprise materials selected from the group consisting of nickel, chrome, copper, aluminum, zinc, and graphite.

The tube dimensions are preferably selected so as to be most efficient for the power plant or other application. The tube can be circular, oblong, or any other shape. The tube is preferably at least 6 inches by ¾ inches in cross section, and at least 20 feet long up to 40 feet long. Typical dimensions of tubes used in this art are 8⅝ inches by 0.75 inches in cross section and 30 to 36 feet in length. When the tubes are circular in cross section, they are typically 3.5 inches diameter circular tubes, but they can also be larger or smaller. The tube thickness can be 0.059 inch, but can be thinner or thicker. However, the tubes can be much larger or smaller than these preferred dimensions.

The fins can be flat or have indentations which function to provide increased structural strength and enhanced heat transfer due to turbulence.

Preferably there are two sets of fins, one on each side of the tube. The fins are located along the width of the tube, i.e., the long dimension, which is typically 8⅝ inches. The fin height can be ½, ⅝ inch or any other height. For such typical tubes, the number of fins typically varies from one to eleven or more per inch. The fins can be smooth or with indentations to augment turbulence to enhance heat transfer and to provide additional strength or rigidity. The fins can be wavy or serpentine, or straight. Other fin dimensions are possible, of course.

The present invention has several advantages over the prior art methods and systems. No galvanization is required, no clad material is required, and no special fin material is required. Unlike the prior art, the coating prior to brazing according to the invention acts as the brazing compound, which eliminates the two step and two different material process required for brazing aluminum clad tube-fin assemblies.

DETAILED DESCRIPTION

Figure 1:
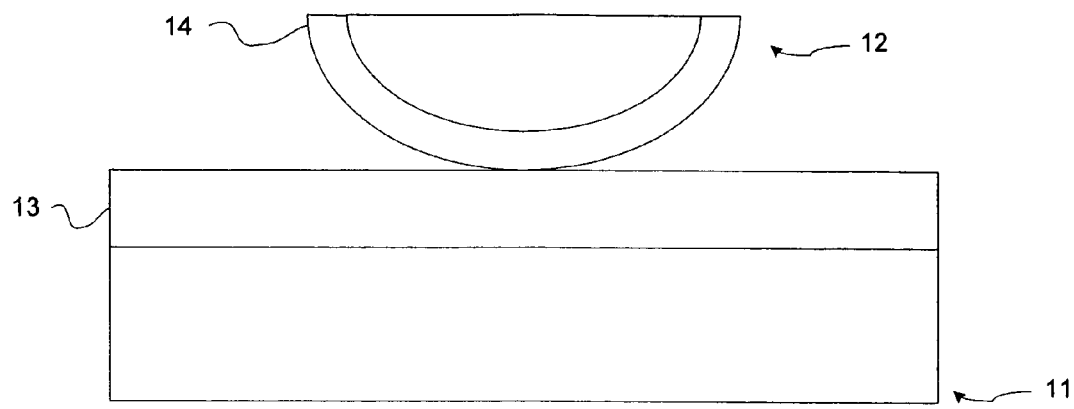
FIG. 1 is fragmentary perspective view of a tube and fin assembly with only one fin illustrated.

Referring to FIG. 1, a carbon steel tube 11 and carbon steel fin 12 are shown. A nickel-chrome brazing compound 13 is on the tube 11 and the same brazing compound coating 14 is on the fin 12. The tube 11 and fin 12 are held together with a clamp (not illustrated) and are subsequently placed in a furnace. The nickel-chrome brazing compound is applied by Fin Tube Products, Inc., Wadsworth, Ohio, using their Cladfin® process wherein a coating of up to one mil thick is applied to the complete tube and fin surfaces, with a diffusion of ½ mil into the surface of the tube and fin. The bonding between the tube and fin creates a stress-free metallurgical bond that is both uniform, and non-porous with a high heat transfer efficiency in the finned tube. The joint is highly resistant to the shock and vibration found in high temperature atmospheres.

Figure 2:
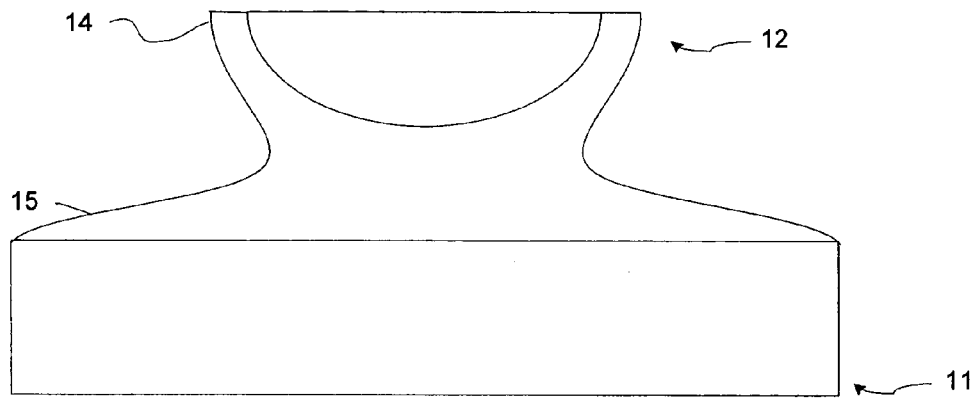
FIG. 2 is a cross sectional view of a fin and tube assembly of the invention, illustrating the brazed coating.

Referring to FIG. 2, the tube 11 and fin 12 are illustrated after the brazing conducted in a furnace. The brazed coating 15 on the tube 11 and fin 12 prevents corrosion and permanently brazes the fin to the tube.

The present invention is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those of ordinary skill in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A fin and tube assembly for use in a heat exchanger comprising a carbon steel tube, a carbon steel fin, and an external coating brazed directly to the tube and fin with no intervening layer.

2. The assembly of claim 1 wherein the external coating is formed from a brazing compound comprising one or more materials selected from the group consisting of nickel, chrome, copper, aluminum, zinc, and graphite.

3. The assembly of claim 1 wherein the tube has an oval or oblong cross section with a fin attached to the tube width on each side.

4. The assembly of claim 1 wherein the tube has an oblong cross section of about 8⅝ in width and about 0.5 inches in height.

5. The assembly of claim 1 wherein the tube has a length of at least 20 feet.

6. The assembly of claim 1 wherein the tube has a length of 20 feet to 40 feet.

7. A method comprising directly coating a steel tube and fin with a brazing compound with no intervening layer, joining the tube and the fin to form an assembly, and heating the assembly in a furnace to cure the coating and attach the fin to the tube.

8. The method of claim 7 comprising coating the fin at a first location, and coating the tube at a separate location.

9. The method of claim 7 comprising coating the fin and the tube at the same location prior to joining the tube and the fin.

10. The method of claim 7 wherein the brazing compound comprises a material selected from the group consisting of nickel, chrome, copper, aluminum, zinc, and graphite.

11. A power plant comprising a steam turbine with electricity generator, a steam generator, and a heat exchanger Which comprises a fin and tube assembly of claim 1.

* * * * *